(12) United States Patent
Kuroishi

(10) Patent No.: US 12,346,486 B2
(45) Date of Patent: Jul. 1, 2025

(54) ENCRYPTION PROCESSING SYSTEM, NON-TRANSITORY COMPUTER READABLE MEDIUM STORING ENCRYPTION PROCESSING PROGRAM, AND ENCRYPTION PROCESSING METHOD

(71) Applicant: FUJIFILM Business Innovation Corp., Tokyo (JP)

(72) Inventor: Kenji Kuroishi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 330 days.

(21) Appl. No.: 17/875,422

(22) Filed: Jul. 28, 2022

(65) Prior Publication Data

US 2023/0229815 A1    Jul. 20, 2023

(30) Foreign Application Priority Data

Jan. 14, 2022    (JP) .................................. 2022-004718

(51) Int. Cl.
*G06F 21/72*    (2013.01)
*G06F 21/62*    (2013.01)

(52) U.S. Cl.
CPC ............ *G06F 21/72* (2013.01); *G06F 21/629* (2013.01)

(58) Field of Classification Search
CPC ............................... G06F 21/72; G06F 21/629
See application file for complete search history.

(56) References Cited

U.S. PATENT DOCUMENTS

2013/0219481 A1*   8/2013   Voltz ...................... H04L 63/20
                                                      726/9

FOREIGN PATENT DOCUMENTS

| EP | 3872671 | 9/2021 |
| JP | 2019092134 | 6/2019 |
| JP | 2020201526 | 12/2020 |

OTHER PUBLICATIONS

"Search Report of Europe Counterpart Application", issued on Jun. 7, 2023, p. 1-p. 7.
"Office Action of Europe Counterpart Application", issued on Oct. 22, 2024, p. 1-p. 5.

* cited by examiner

*Primary Examiner* — Hee K Song
(74) *Attorney, Agent, or Firm* — JCIPRNET

(57) ABSTRACT

An encryption processing system in which an application accesses a security module, via software, from a device driver that communicates with the software, in which the software issues an identifier for managing a session for each access request from the application, to identify accesses from plural applications, and notifies the device driver of identifiers together with commands.

19 Claims, 9 Drawing Sheets

ENCRYPTION PROCESSING SYSTEM, NON-TRANSITORY COMPUTER READABLE MEDIUM STORING ENCRYPTION PROCESSING PROGRAM, AND ENCRYPTION PROCESSING METHOD

CROSS-REFERENCE TO RELATED APPLICATIONS

This application is based on and claims priority under 35 USC 119 from Japanese Patent Application No. 2022-004718 filed Jan. 14, 2022.

BACKGROUND

(i) Technical Field

The present disclosure relates to an encryption processing system, a non-transitory computer readable medium storing an encryption processing program, and an encryption processing method.

(ii) Related Art

Techniques related to encryption processing are disclosed. JP2020-201526A discloses an encryption processing platform including a secure element that can be customized. In the encryption processing platform of JP2020-201526A, the encryption processing hardware can be shared by a default code and a custom code. The encryption processing platform of JP2020-201526A defines the default code and default code confidential information used by the default code as an access prohibited area.

JP2019-092134A discloses a system capable of detecting falsification of an object code due to mutual authentication abnormality or the like.

SUMMARY

Encryption processing systems need to comply with the Federal Information Processing Standard 140 (FIPS 140), which defines the specifications of security requirements for security modules. Therefore, in a case where the specifications of FIPS 140 are revised, for example, it is preferable that the encryption processing system is implemented according to the revised specifications.

Aspects of non-limiting embodiments of the present disclosure relate to an encryption processing system, a non-transitory computer readable medium storing an encryption processing program, and an encryption processing method that enable management for each session in multi-access.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an encryption processing system in which an application accesses a security module, via software, from a device driver that communicates with the software, in which the software issues an identifier for managing a session for each access request from the application, to identify accesses from a plurality of applications, and notifies the device driver of identifiers together with commands.

BRIEF DESCRIPTION OF THE DRAWINGS

Exemplary embodiment(s) of the present invention will be described in detail based on the following figures, wherein.

DETAILED DESCRIPTION

Figure 1:
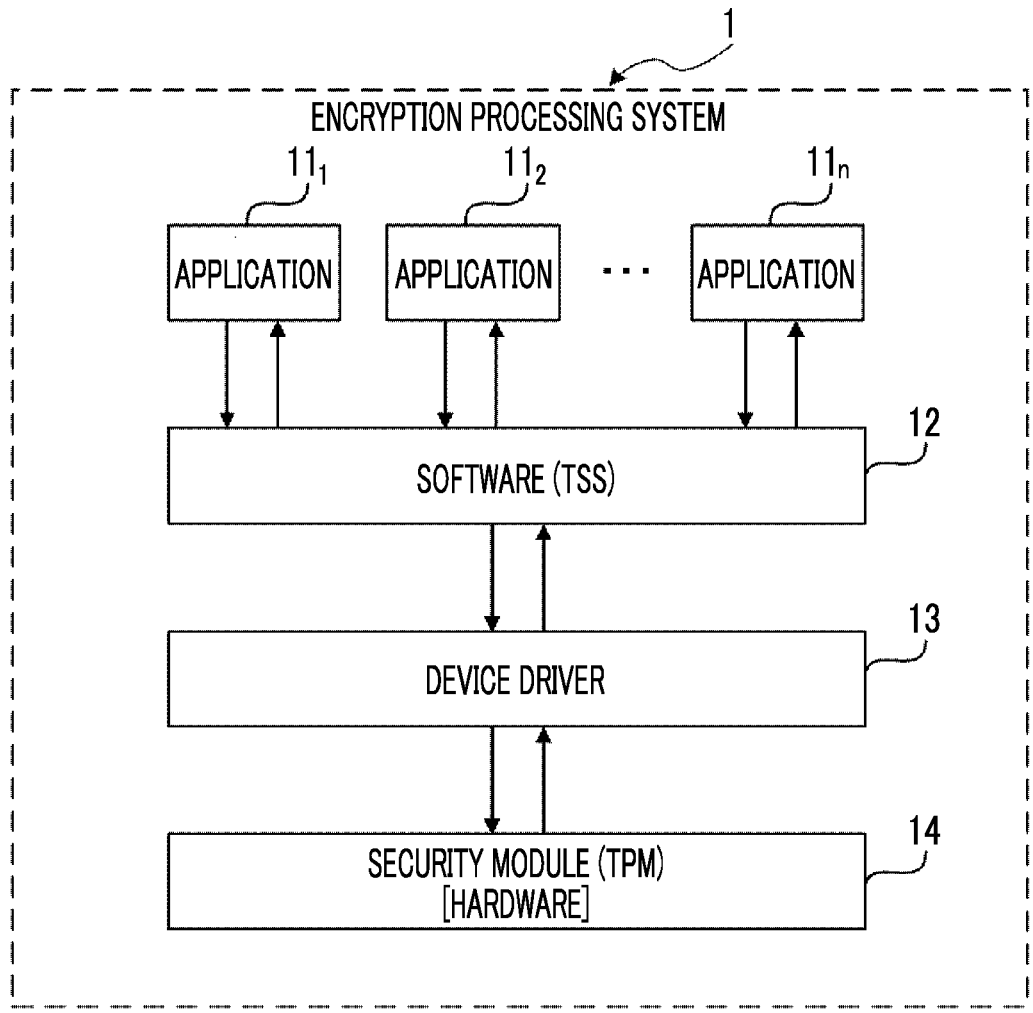
FIG. 1 is a diagram showing a functional configuration of an encryption processing system.

Hereinafter, exemplary embodiments of the present disclosure will be described with reference to the drawings. The same reference numerals are given to the same or equivalent components and parts in each drawing. In addition, the dimensional ratios in the drawings are exaggerated for convenience of explanation and may differ from the actual ratios.

In the revision from FIPS 140-2 to FIPS 140-3, in a case where encryption processes or key exchange methods by the algorithms not approved by the National Institute of Standards and Technology (NIST) are used, it is required to notify the user (application) of that fact. Currently, the implementation of software in information equipment to be actually used is under consideration.

Operations on the security module are performed by issuing a command sequence consisting of a plurality of commands. The command is a unit for exchanging session ID, encryption key, or the like required for the encryption processing of the application. Incidentally, in a case where it is checked that each command is executed with the parameters recognized by NIST, the processor on the TPM side is burdened, the communication time overhead is required, and the processing time is slowed down. The NIST-approved algorithm also contains irrelevant commands, which deteriorates efficiency. Therefore, for example, it is desirable to check the status cumulatively. However, access requests from a plurality of applications are allowed to be operated simultaneously by multithreading. Therefore, there has been a problem that the status command cannot be issued at an appropriate timing from the software (TSS) that issues a command for accessing the TPM, and the correct status cannot be read. Therefore, the encryption processing system of each exemplary embodiment of the present disclosure (hereinafter referred to as the present exemplary embodiment) is implemented such that management for each session in multi-access may be performed.

FIG. 1 is a diagram showing a functional configuration of an encryption processing system. As shown in FIG. 1, the encryption processing system 1 includes a plurality of applications 11 ($11_{1 \text{ to } n}$), software 12 as a TPM Software Stack (TSS), a device driver 13, and a security module 14 as a TPM. Of these, the security module 14 is hardware. The software communicates with the application 11 and the device driver 13. The device driver 13 communicates with the software 12 and the security module 14. The encryption processing system 1 is configured to access the security module 14 from the device driver 13, via the software 12 from the application 11. The software 12 manages the execution instruction from the access source application 11 by the session ID. The session ID is an example of the "identifier" of the technique of the present disclosure.

Figure 2:
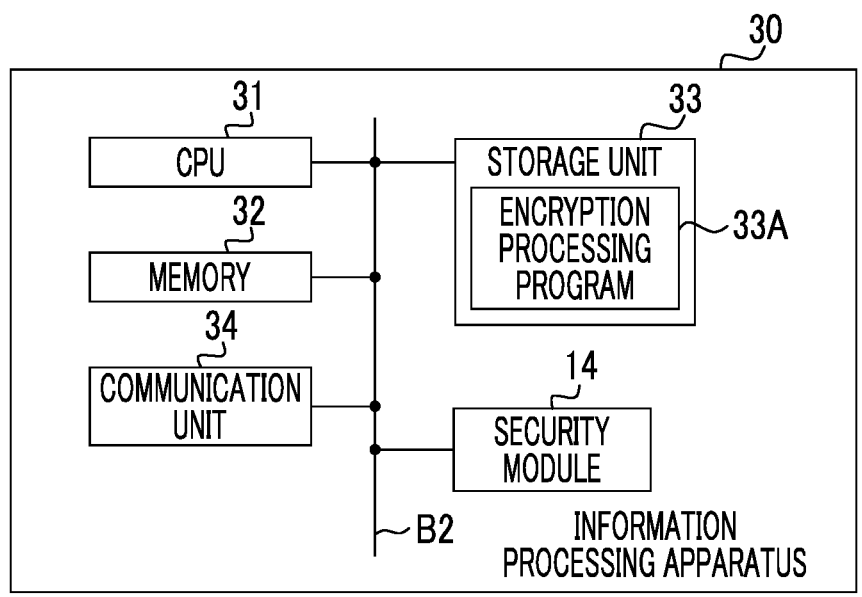
FIG. 2 is a block diagram showing a hardware configuration of an information processing apparatus causing the encryption processing system to function.

FIG. 2 is a block diagram showing a hardware configuration of an information processing apparatus 30 that causes the encryption processing system 1 to function. An apparatus such as a computer or a server may be applied to the information processing apparatus 30. The information processing apparatus 30 according to the present exemplary embodiment includes a CPU 31, a memory 32 that is a temporary storage area, a non-volatile storage unit 33, the above-described security module 14, and a communication unit 34 that communicates with an external device. Configuration elements are connected to each other via a bus B2.

The storage unit 33 is implemented by a storage device such as an HDD, an SSD, or a flash memory. An encryption processing program 33A and various programs are stored in the storage unit 33 that is a storage medium. The CPU 31 reads the encryption processing program 33A from the storage unit 33, expands the encryption processing program 33A into the memory 32, and sequentially executes the processes included in the encryption processing program 33A. By executing the encryption processing program 33A, each process for the application 11, the software 12, and the device driver 13 described above is executed. In a case of executing the above program, the information processing apparatus 30 implements various functions by using the above hardware resources. As described above, each functional configuration of the encryption processing system 1 is implemented by the hardware configuration of the information processing apparatus 30.

First Exemplary Embodiment

Common to each exemplary embodiment, in the encryption processing system 1, there are access requests from the plurality of applications 11, and multi-access is assumed. For comparison, the flow of single access and the flow of multi-access will be compared and explained. In any access, the software 12 issues a session ID for managing the session for each access request from the application, and notifies the device driver 13 of the session ID together with the command. The device driver 13 acquires compliance information indicating compliance with FIPS from the security module 14. In the case of multi-access, accesses from the plurality of applications 11 can be identified by the session IDs.

Further, the software 12 sets a flag for managing compliance with the security standards in FIPS for each session. Compliance information of security standards can be acquired from the security module 14. The flag can be represented by a binary value such as "00", "01", "10", or the like, and can be updated by performing an OR operation.

In this case, "00" can be set as the initial value. The software 12 receives the compliance information as a return value from the device driver 13 at a predetermined timing, and updates the flag based on the received compliance information. An example of updating the flag will be described. For example, in a case where the compliance information acquired for session ID: 00 is compatible, the flag is represented by "01", and in a case where the compliance information acquired for session ID: 01 is compatible, the flag is represented by "10". In this case, assuming that the compliance information for the session ID: 00 is acquired, the flag can be updated as "01", by the OR operation of "00" and "01". The timing will be described using a sequence.

Figure 3:
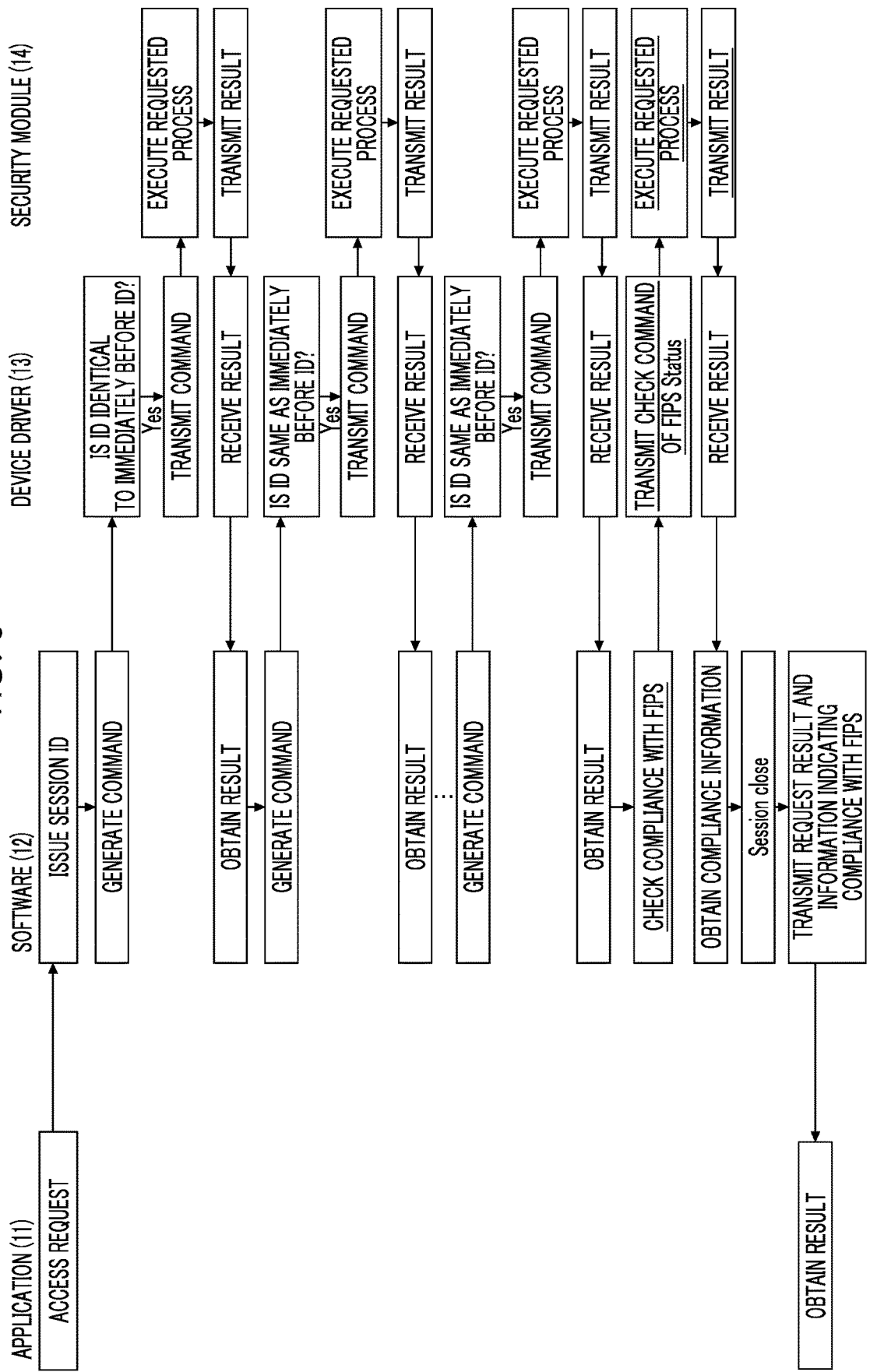
FIG. 3 is a diagram for explaining a flow assumed in a case of single access.
Figure 4:
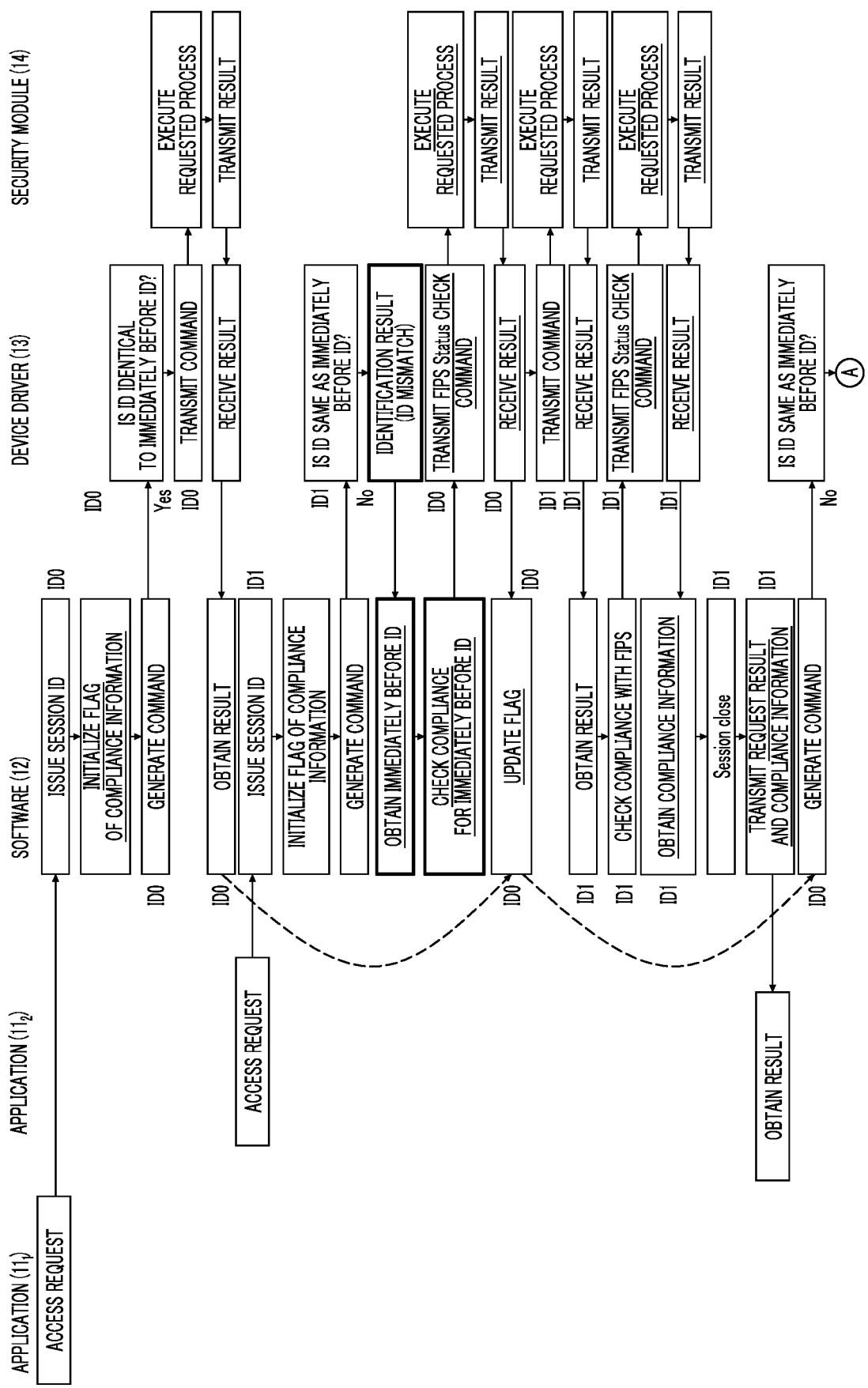
FIG. 4 is a diagram for explaining a flow assumed in a case of multi-access in a first exemplary embodiment.
Figure 5:
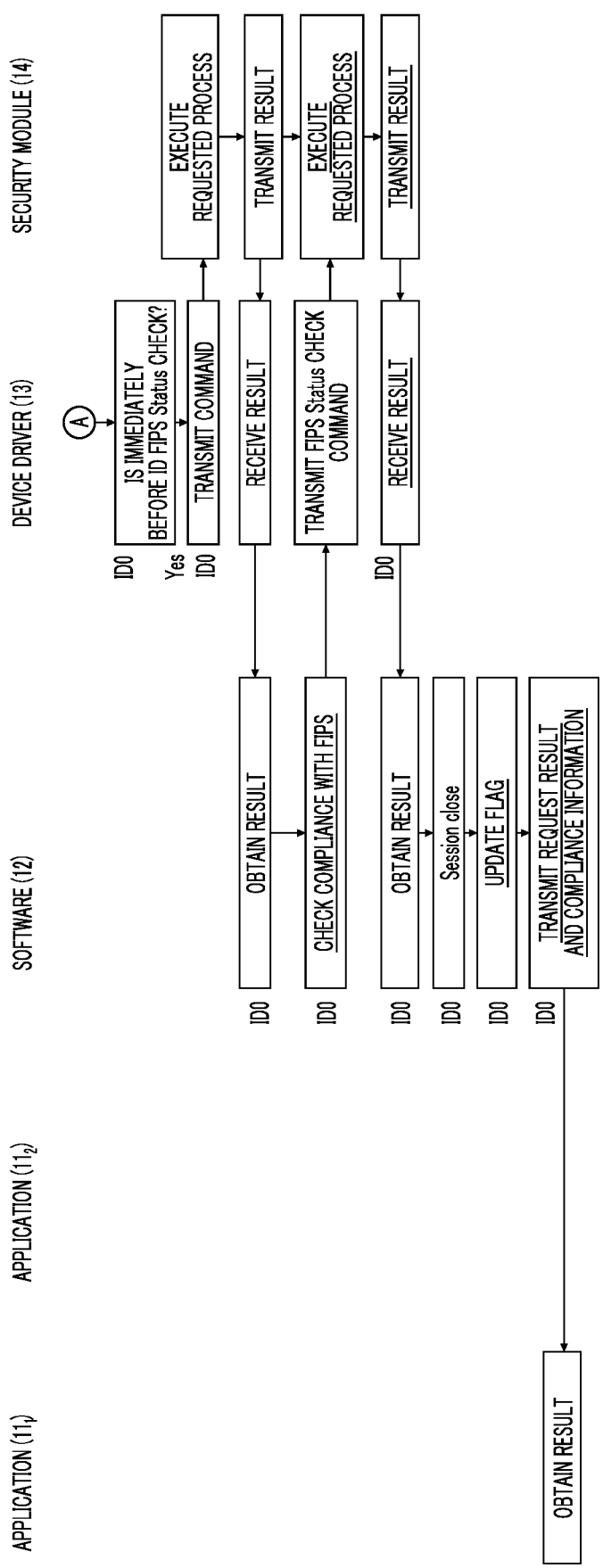
FIG. 5 is a diagram for explaining a flow assumed in a case of multi-access.

FIG. 3 is a diagram for explaining a flow assumed in the case of single access. FIGS. 4 and 5 are diagrams for explaining a flow assumed in the case of multi-access.

The outline of single access and multi-access will be described below. The specific sequence flows will be described later. The flow shown in FIG. 4 assumes that there is a single access from a single application 11. In the case of single access, in a case where the software 12 receives an access request from the application 11, the software 12 issues a session ID indicating the session of the access request. The software 12 generates a command for the session (a command sequence consisting of each command) and transmits the command to the device driver 13. The device driver 13 transmits the command to the security module 14. The security module 14 executes the requested command and returns an execution result to the device driver 13. After acquiring and returning the execution results of all the commands, the device driver 13 acquires compliance information indicating compliance with FIPS and notifies the software 12 of the compliance information. The compliance information is acquired by transmitting a check command for receiving the compliance information to the security module 14. Thus, the software 12 obtains the compliance information for the session. The software 12 closes the session and transmits the result including the compliance information and the execution result of the command to the application 11. The application 11 receives the result from the security module 14 (TPM).

The flow shown in FIGS. 4 and 5 assumes that there is multi-access from application $11_1$ and application $11_2$. In FIGS. 4 and 5, the session ID of the application $11_1$ is shown as "ID0", and the session ID of the application $11_2$ is shown as "ID1". Hereinafter, a difference from single access will be described as the main points. In the case of multi-access, in a case where the software 12 receives the access request, after issuing the session ID, the software 12 initializes the flag for managing the compliance information for the session ID and sets the flag. In a case of receiving a new command, the device driver 13 determines whether or not the session ID of the newly received command is identical to the session ID attached to the command executed immediately before. For convenience of explanation, the session ID (immediately before session ID) attached to the command executed immediately before is set as "first session ID". The session ID of the newly received command is set as "second session ID". In a case where the session IDs are not identical to each other, it is determined that the session IDs are different, and it is necessary to acquire compliance information. The first session ID is an example of the "first identifier" in the technique of the present disclosure, and the second session ID is an example of the "second identifier" in the technique of the present disclosure.

Here, in the first exemplary embodiment, in a case where the device driver 13 determines that the session IDs are different, the device driver 13 notifies the software 12 of the mismatch identification information including the first session ID. In a case of receiving the notification of the mismatch identification result, the software 12 transmits, to the device driver 13, a check command for receiving the status of the compliance information for the first session ID for which the notification is received. The device driver 13 transmits a check command to the security module 14, and returns the compliance information acquired from the security module 14 to the software 12. The software 12 updates the flag in the session of the first session ID, by using the returned compliance information. Further, the device driver 13 transmits the command for the second session ID to the security module 14 together with the return of the compliance information, and returns the execution result of the command acquired from the security module 14 to the software 12.

Figure 6:
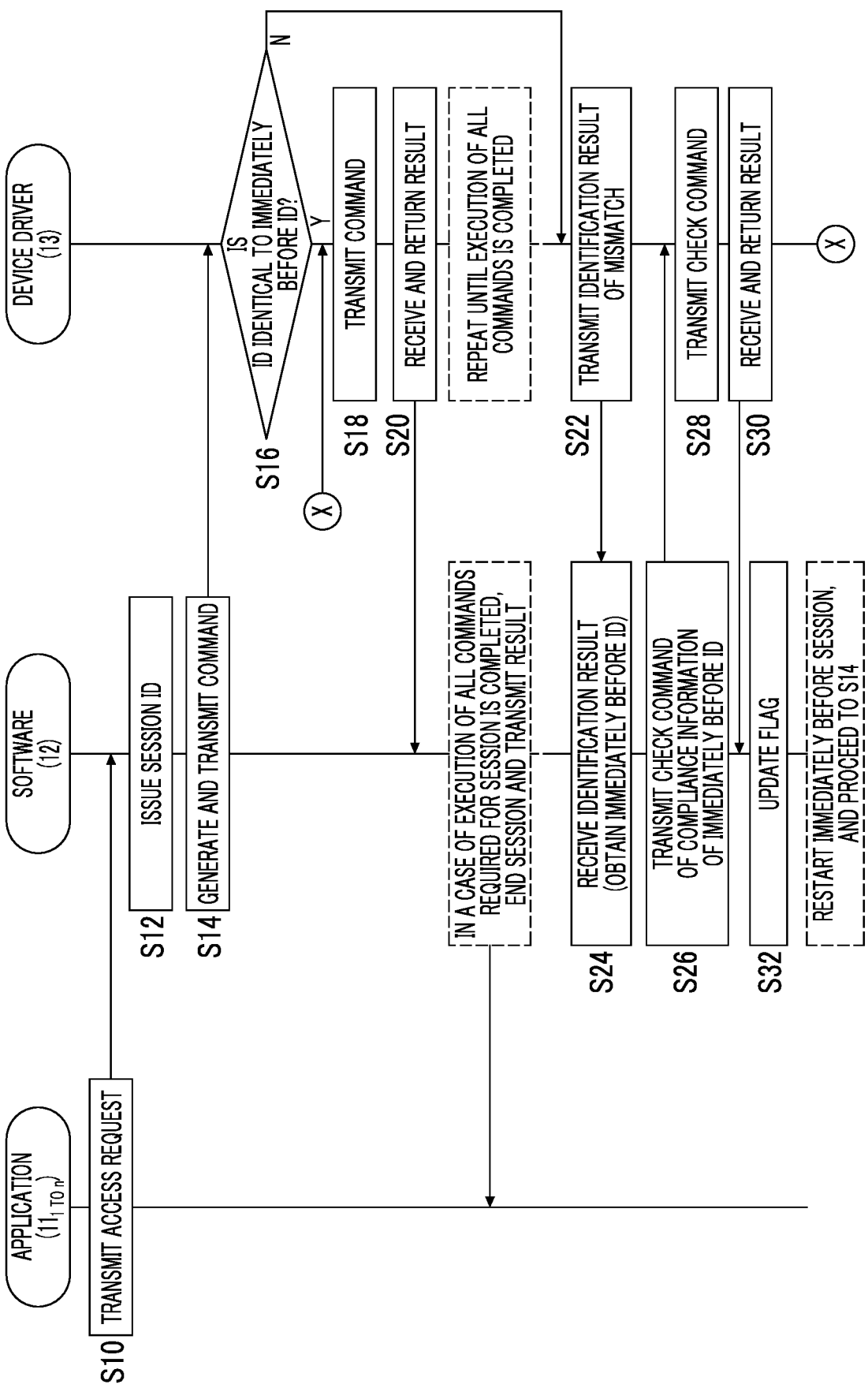
FIG. 6 is a sequence showing a processing flow in an encryption processing system in the first exemplary embodiment.

FIG. 6 is a sequence showing a processing flow in an encryption processing system 1 of the first exemplary embodiment.

In S10, the application 11 transmits an access request to the software 12.

In S12, the software 12 issues a session ID for managing the session of the received access request.

In S14, the software 12 generates a command, and transmits the command to the device driver 13 including the issued session ID.

In S16, the device driver 13 determines whether or not the session ID attached to the received command is identical to the session ID attached to the command executed immediately before. In a case where it is determined that the session IDs are identical to each other, the process proceeds to S18. In a case where it is determined that the session IDs are not identical to each other, it is assumed that the attached session ID is a second session ID different from the first session ID, and the process proceeds to S22. In a case where an immediately before command is not executed, the process proceeds to S18.

In S18, the device driver 13 transmits a command to the security module 14.

In S20, the device driver 13 receives the execution result of the command from the security module 14, and returns the execution result of the command to the software 12.

The software 12 and the device driver 13 execute the processes S14 to S20 until the execution of all the commands required in the session is completed. In a case where the command execution is completed, the software 12 closes the session and transmits the returned execution result of the command. In a case where the compliance information is acquired in S22 or later, the software 12 transmits, to the application 11, the execution result of the command and the compliance information which is the execution result of the check command.

The process after S22 is a process in a case where the session IDs are different in the determination of S16.

In S22, the device driver 13 notifies the software 12 of the mismatch identification result including the first session ID.

In S24, the software 12 receives the mismatch identification result. Thus, the software 12 obtains the first session ID of the command executed immediately before.

In S26, the software 12 transmits, to the device driver 13, a check command for receiving the status of the compliance information for the first session ID.

In S28, the device driver 13 transmits a check command to the security module 14.

In S30, the device driver 13 receives the execution result of the check command from the security module 14, and returns the compliance information as the execution result of the check command to the software 12. By returning in S30 in this way, the timing is defined such that the software 12 receives the compliance information.

In S32, the software 12 updates the flag in the session of the first session ID, by using the returned compliance information.

Further, the device driver 13 shifts to S18 at (X) in parallel with S28, transmits a command for the second session ID to the security module 14, and returns the execution result of the command to the software 12. The software 12 closes the session after updating the flag in S32 and after receiving the result of the command of the second session ID. Then, after closing the session of the second session ID, the generation of the command of the first session ID is restarted.

In a case where the session of the second session ID is closed and then the command of the first session ID is restarted, in S16, it is determined that the session ID is different from the session ID immediately before. In this case, the device driver 13 determines whether or not the command executed immediately before is a check command, after this process. In a case where the command executed immediately before is a check command, the encryption processing system 1 executes S18 and S20 for the restarted first session ID, and then executes S26 to S32 to end a session.

As described above, in a case where the command executed immediately before is the check command for receiving the compliance information, the device driver 13 prohibits the checking of the compliance information and notification of the checking, even in a case where the session IDs are different. Further, the software 12 has a function of ending the session after notifying the application 11 of the acquired compliance information. In a case of closing the session from the application 11, the software 12 transmits a check command for receiving the compliance information to the device driver 13, acquires the compliance information, updates the flag, and notifies the application 11.

As described above, according to the encryption processing system 1 according to the first exemplary embodiment, access requests in multi-access may be managed for each session and compliance information on the session may be acquired.

Second Exemplary Embodiment

Figure 7:
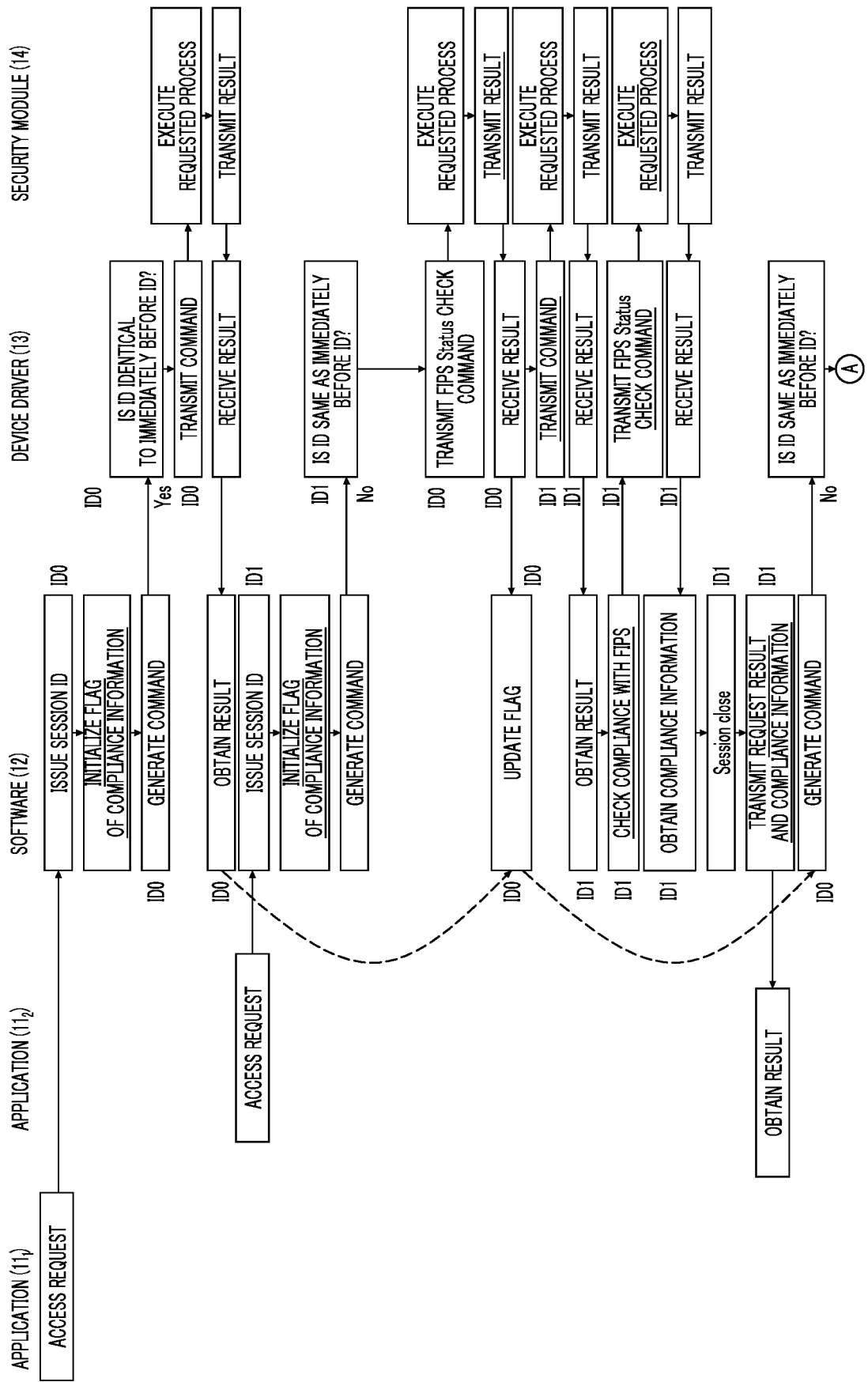
FIG. 7 is a diagram for explaining a flow assumed in the case of multi-access in a second exemplary embodiment.

FIG. 7 is a diagram for explaining a flow assumed in the case of multi-access in a second exemplary embodiment. In the second exemplary embodiment, the notification to the software 12 in a case where the session IDs are different is omitted, and the device driver 13 directly transmits the check command to the security module 14.

Figure 8:
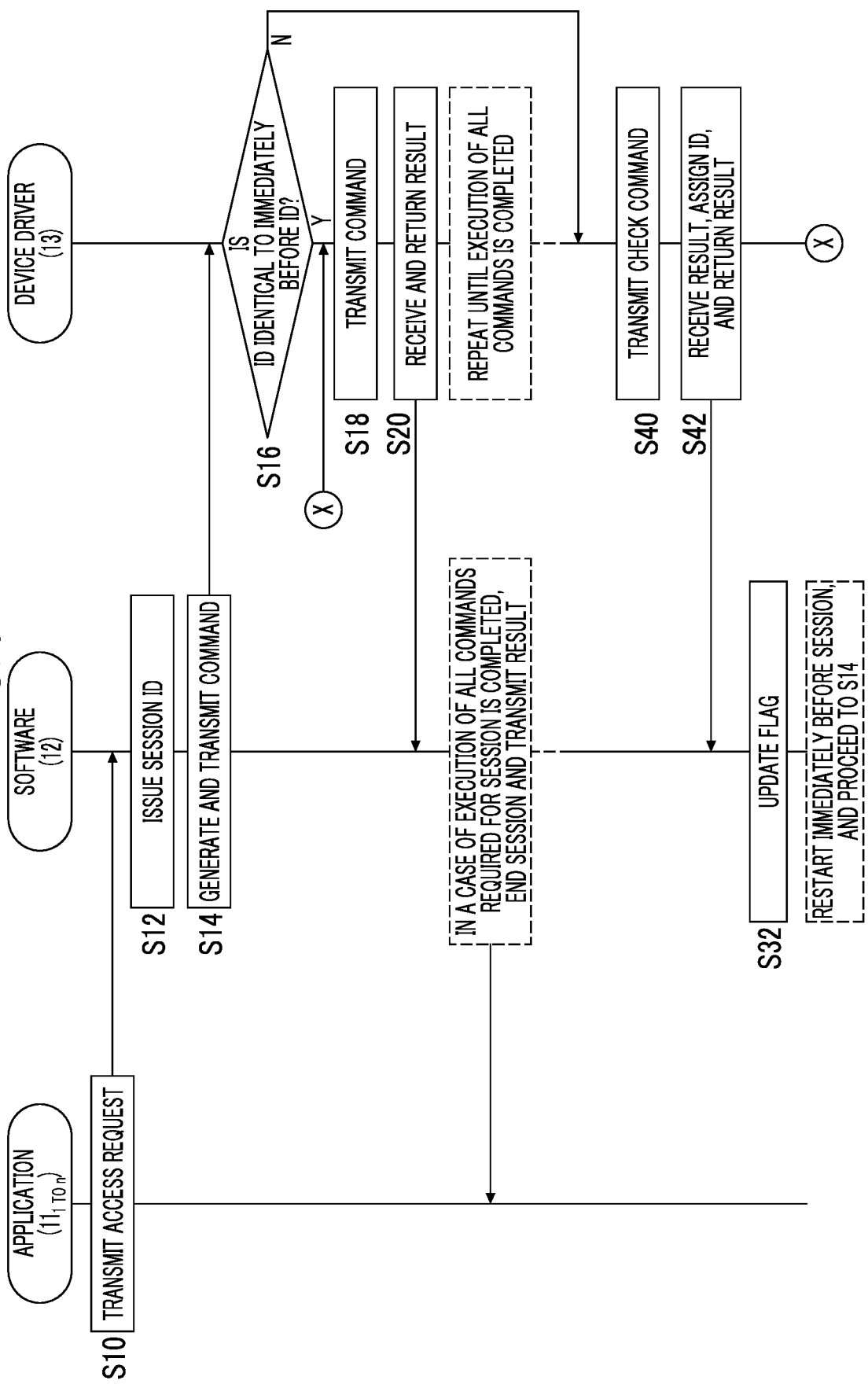
FIG. 8 is a sequence showing a processing flow in an encryption processing system in the second exemplary embodiment.

FIG. 8 is a sequence showing a processing flow in an encryption processing system 1 of the second exemplary embodiment. The second exemplary embodiment is different from the first exemplary embodiment in that S22 to S26 are omitted from the sequence of the first exemplary embodiment of FIG. 6.

In S40, the device driver 13 transmits a check command to the security module 14. In S42, the device driver 13 assigns the first session ID to the compliance information acquired from the security module 14 and returns the compliance information to the software 12.

Third Exemplary Embodiment

Figure 9:
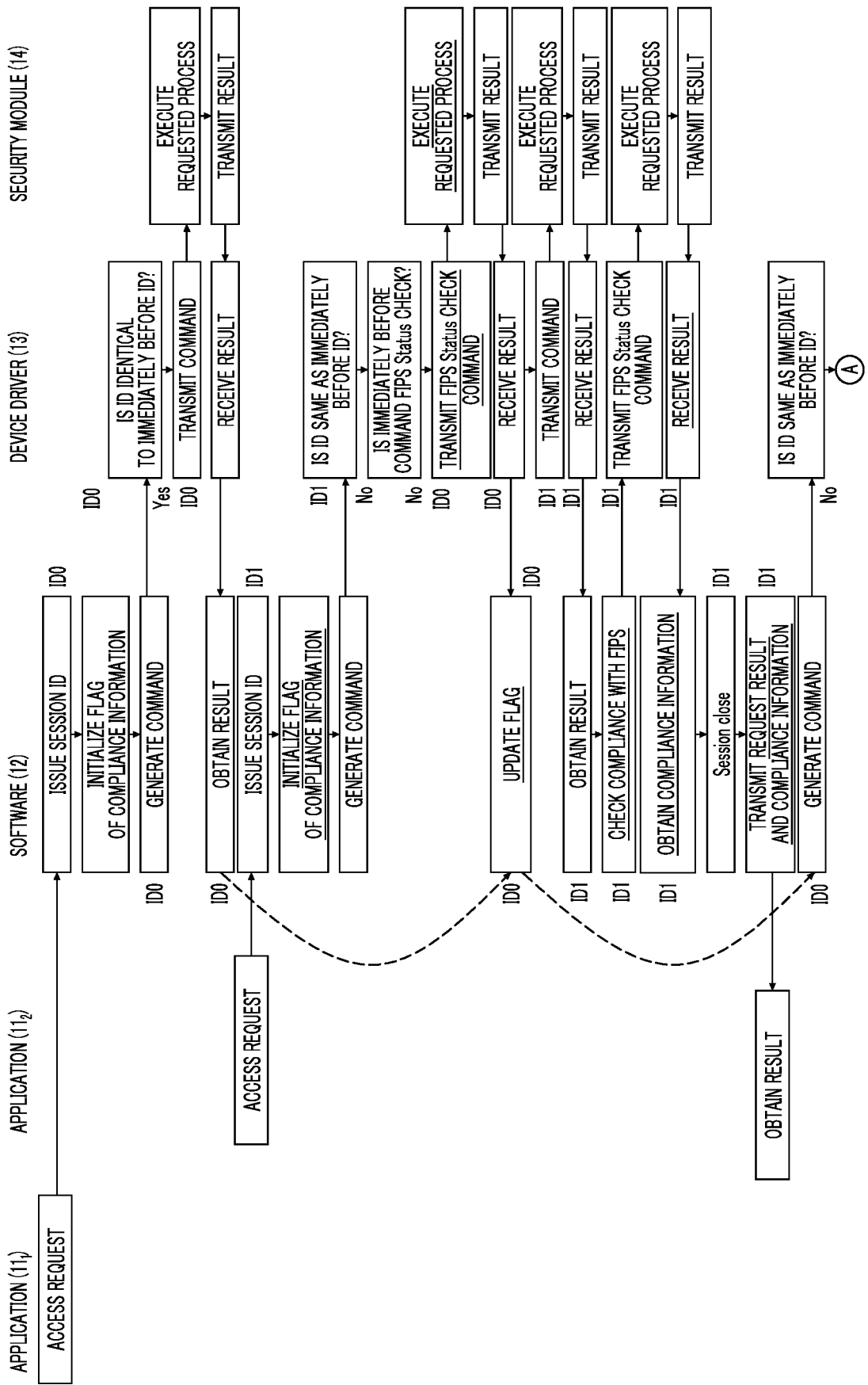
FIG. 9 is a diagram for explaining a flow assumed in the case of multi-access in a third exemplary embodiment.
Figure 10:
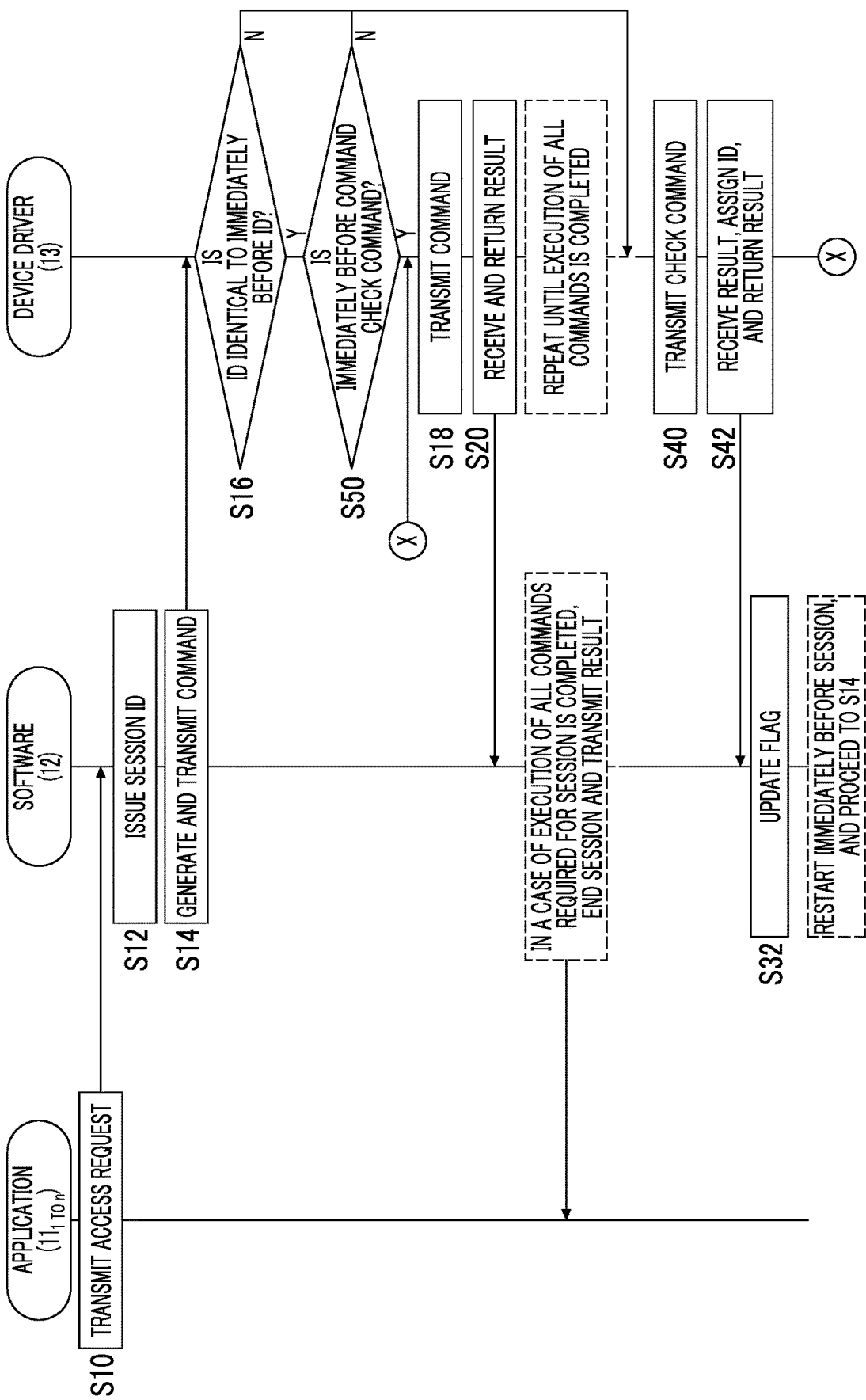
FIG. 10 is a sequence showing a processing flow in an encryption processing system in the third exemplary embodiment.

FIG. 9 is a diagram for explaining a flow assumed in the case of multi-access in a third exemplary embodiment. The third exemplary embodiment is different from the second exemplary embodiment in that in a case where the session IDs are different, it is determined whether or not the immediately before command is a check command. FIG. 10 is a sequence showing a processing flow in an encryption processing system 1 of the third exemplary embodiment. In S50, the device driver 13 determines whether or not the command executed immediately before is a check command. In a case where the command is the check command, the command is transmitted in S18, without checking the compliance information. In a case where the command is not the check command, the check command is transmitted in S40.

The encryption processing system 1 of each of the above exemplary embodiments may be appropriately modified and implemented. For example, in the encryption processing system 1, it may be defined that in a case where an error occurs, the software 12 notifies the application 11 of an access error and does not check the compliance with the security standard. Examples of the error include a case where the maximum value of simultaneous accesses allowed by the security module 14 is reached, and a case where the command is not executed normally.

It should be noted that various processors other than the CPU may execute various processes in which the CPU reads and executes the program in each of the above exemplary embodiments. In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). Further, various processes may be executed by one of these various processors, or may be executed by a combination of two or more processors of the same type or different types (for example, a combination of a plurality of FPGAs, and a combination of a CPU and an FPGA, or the like). Further, the hardware structure of these various processors is, more specifically, an electric circuit in which circuit elements such as semiconductor elements are combined.

Further, in each of the above exemplary embodiments, a mode in which a program for executing various processes is stored (installed) in advance has been described, but the present invention is not limited to this. The program may be provided in a form recorded on a non-transitory recording medium such as a Compact Disk Read Only Memory (CD-ROM), a Digital Versatile Disk Read Only Memory (DVD-ROM), and a Universal Serial Bus (USB) memory. Further, the program may be downloaded from an external apparatus via a network.

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An encryption processing system in which an application accesses a security module, via software, from a device driver that communicates with the software, wherein the software
    issues an identifier for managing a session for each access request from the application, to identify accesses from a plurality of applications,
    notifies the device driver of identifiers together with commands,
    sets a flag for managing compliance with security standards in Federal Information Processing Standards for each session,
    receives compliance information of the security standards as a return value from the device driver at a predetermined timing, and
    updates the flag based on the received compliance information.

2. The encryption processing system according to claim 1, wherein the security module executes a command that is generated by the software and received from the device driver,
    the device driver notifies the software of a mismatch identification result including a first identifier, in a case where the identifier attached to the command received from the software is a second identifier different from the first identifier attached to the command executed immediately before,
    the software transmits, to the device driver, a check command for receiving the compliance information for the first identifier for which notification is received, in a case of receiving the notification of the mismatch identification result,
    the device driver transmits the check command to the security module, returns the compliance information acquired from the security module to the software, transmits a command of the second identifier to the security module, and returns an execution result of the command acquired from the security module to the software, and
    the software updates the flag in a session of the first identifier, by using the compliance information.

3. The encryption processing system according to claim 1, wherein the security module executes a command that is generated by the software and received from the device driver,
    the device driver, in a case where the identifier attached to the command received from the software is a second identifier different from the first identifier attached to the command executed immediately before, transmits a check command for receiving the compliance information for the first identifier, to the security module, attaches the first identifier to the compliance information acquired from the security module, and returns the compliance information with the first identifier to the software, transmits a command of the second identifier to the security module, and returns an execution result of the command acquired from the security module to the software, and
    the software updates the flag in a session of the first identifier, by using the compliance information.

4. The encryption processing system according to claim 1, wherein, in a case where the command executed immediately before is a check command for receiving the compliance information and the identifiers are different, the device driver prohibits checking of the compliance information and the notification of the checking.

5. The encryption processing system according to claim 2, wherein, in a case where the command executed immediately before is a check command for receiving the compliance information and the identifiers are different, the device driver prohibits checking of the compliance information and the notification of the checking.

6. The encryption processing system according to claim 3, wherein, in a case where the command executed immediately before is a check command for receiving the compliance information and the identifiers are different, the device driver prohibits checking of the compliance information and the notification of the checking.

7. The encryption processing system according to claim 1, wherein the software has a function of transmitting a check command for receiving the compliance information to the device driver, notifying the application of the acquired compliance information, and ending a session, in a case of closing the session from the application.

8. The encryption processing system according to claim 2, wherein the software has a function of transmitting a check command for receiving the compliance information to the device driver, notifying the application of the acquired compliance information, and ending a session, in a case of closing the session from the application.

9. The encryption processing system according to claim 3, wherein the software has a function of transmitting a check command for receiving the compliance information to the device driver, notifying the application of the acquired compliance information, and ending a session, in a case of closing the session from the application.

10. The encryption processing system according to claim 4, wherein the software has a function of transmitting a check command for receiving the compliance information to the device driver, notifying the application of the acquired compliance information, and ending a session, in a case of closing the session from the application.

11. The encryption processing system according to claim 5, wherein the software has a function of transmitting a check command for receiving the compliance information to the device driver, notifying the application of the acquired compliance information, and ending a session, in a case of closing the session from the application.

12. The encryption processing system according to claim 6, wherein the software has a function of transmitting a check command for receiving the compliance information to the device driver, notifying the application of the acquired compliance information, and ending a session, in a case of closing the session from the application.

13. The encryption processing system according to claim 1, wherein, in a case where a maximum value of simultaneous access allowed by the security module is exceeded, or in a case where the command is not executed normally, the software notifies the application of an access error and does not check the compliance with the security standards.

14. The encryption processing system according to claim 2, wherein, in a case where a maximum value of simultaneous access allowed by the security module is exceeded, or in a case where the command is not executed normally, the software notifies the application of an access error and does not check the compliance with the security standards.

15. The encryption processing system according to claim 3, wherein, in a case where a maximum value of simultaneous access allowed by the security module is exceeded, or in a case where the command is not executed normally, the software notifies the application of an access error and does not check the compliance with the security standards.

16. The encryption processing system according to claim 4, wherein, in a case where a maximum value of simultaneous access allowed by the security module is exceeded, or in a case where the command is not executed normally, the software notifies the application of an access error and does not check the compliance with the security standards.

17. The encryption processing system according to claim 5, wherein, in a case where a maximum value of simultaneous access allowed by the security module is exceeded, or in a case where the command is not executed normally, the software notifies the application of an access error and does not check the compliance with the security standards.

18. A non-transitory computer readable medium storing an encryption processing program in which an application accesses a security module, via software, from a device driver that communicates with the software, the program causing a computer to execute a process comprising:
    issuing an identifier for managing a session for each access request from the application, to identify accesses from a plurality of applications;
    notifying the device driver of identifiers together with commands;
    setting a flag for managing compliance with security standards in Federal Information Processing Standards for each session;
    receiving compliance information of the security standards as a return value from the device driver at a predetermined timing, and
    updating the flag based on the received compliance information.

19. An encryption processing method in which an application accesses a security module, via software, from a device driver that communicates with the software, the method comprising:
    issuing an identifier for managing a session for each access request from the application, to identify accesses from a plurality of applications;
    notifying the device driver of identifiers together with commands;
    setting a flag for managing compliance with security standards in Federal Information Processing Standards for each session,
    receiving compliance information of the security standards as a return value from the device driver at a predetermined timing, and
    updating the flag based on the received compliance information.

* * * * *